Patented May 19, 1936

2,041,248

UNITED STATES PATENT OFFICE 2,041,248

CONDENSATION PRODUCT AND PROCESS OF MAKING THE SAME

Almon G. Hovey, Detroit, Mich., assignor to Helmuth Reichhold, doing business as Reichhold Chemicals, Detroit, Mich.

No Drawing. Application May 5, 1934, Serial No. 724,209

4 Claims. (Cl. 260—8)

The present invention relates to artificial resin-plasticizers of the condensed mixed ester type and comprises an improved composition formed from certain polybasic acids, polyhydric alcohols, and from special non-drying oils or glycerides. While glycerol preferably is employed in the process, other polyhydric alcohols, such as the glycols, may be employed if desired.

By the term "non-drying oils" it will be understood that oils having an iodine number of 100 or less are referred to, in accordance with the commonly accepted definitions of the term.

It has long been known that mixed esters may be prepared by heating polyhydric alcohols such as glycerol with fatty acids of natural oils together with polybasic acids. Arsem U. S. Patent 1,098,777 (1914); Dawson U. S. Patent 1,141,944 (1915); Weber U. S. Patent 1,690,515 (1928). While Weber was the first to realize the value of his products when used in conjunction with nitrocellulose, the products he described were not flexible enough in themselves to give any marked plasticization to nitrocellulose. Furthermore, Weber's examples all contained phthalic anhydride which should be avoided in a resin-plasticizer because of its tendency to cause brittleness especially at lower temperatures. More important, however, is the significant fact that Weber states (page 1, lines 65–75 of U. S. Patent 1,690,515), "Resins prepared from the fatty acids of drying or semi-drying vegetable oils are superior to those prepared from the drying oils themselves in that they can be prepared with greater ease and with less danger of polymerization and with consequent loss of the materials and a homogenous resin is produced containing no free oil and which would interfere with the production of suitable articles for all purposes when blended with a cellulose ester or ether." There is no doubt that Weber would have preferred to use oils instead of oil acids had he known the proper technique to combine them chemically with the other ingredients instead of merely making a mixture.

Bruson (U. S. Patent 1,783,168, 1930) described a resin-plasticizer produced from glycerol, fatty acids of natural oils with or without free oil, and from dibasic acids having a chain length of at least six carbon atoms; viz., adipic, pimelic, suberic, azelaic, and sebacic acids. However, most of these acids are comparatively rare and expensive to prepare, some of them still being actual chemical curiosities. In formulating these products, the fatty acids of natural oils are required. The preparation of the fatty acids from oils requires considerable time and expense, to say nothing of the difficulties of darkening of the product and the trouble of purification. Chiefly on account of these reasons, resinous products made according to this process have been so costly that there has not been nearly so much use of them as there would be if the cost were materially lowered.

I have discovered that excellent resin-plasticizers may be produced from certain short chain aliphatic acids (such as succinic and maleic acids), polyhydric alcohols (such as glycerol) and special oils, i. e. oils of the non-drying type. It is true that it is known that resins have been prepared from polybasic acids, polyhydric alcohols and from vegetable oils, by Howell, U. S. Patent 1,098,728 (1914) and by Weber, U. S. Patent 1,690,515 (1928). As stated already, Weber preferred resins prepared from the fatty acids rather than from the corresponding oils. Aside from the fact that his examples were all of the drying and semi-drying types, they also contained aromatic dibasic acids, the former fact causing ultimate brittleness and the latter fact causing inherent brittleness, so that his products were valueless as resin-plasticizers. Howell described the condensation product of phthalic anhydride, glycerol and one very special oil in low proportions, viz., castor oil, which is not a true example of a non-drying oil, inasmuch as it contains a hydroxyl group in the ricinoleic radical, and because of this, a certain amount of the castor oil may actually be reacted with the polybasic acid. In this way a clear resin may be obtained according to Howell's method, but if the castor oil content is as high as that which I require for resin-plasticizer, the oil is not all "taken up" or chemically combined by simple heating. Such resinuous products impart the peculiar fault to a nitrocellulose lacquer known as "spewing". However, the properties obtained from a narrow group of polybasic acids (specifically excluding the aromatic acids), and from a special group of oils (specifically excluding all but the non-drying oils) chemically combined with a polyhydric alcohol such as glycerol by a special efficient process are not only unique and unexpected, but also the economic advantages over products made to serve the same purpose according to prior art are so great that it is felt that an important advancement has been made in the art.

Succinic and maleic acids are already used in industry and are more easily prepared than the long chain type of acid, and therefore give a favorable cost advantage. In addition to the lower cost of the short chain acids, there is a greater net saving because only a smaller quantity of the acid is necessary due to the fact that the molecular weight is lower. Although it has heretofore been impossible to incorporate large quantities of non-drying vegetable oils directly into an alkyd type of resin and still have a clear homogeneous product, I have discovered that it is possible to combine them chemically in the process which I am about to describe. Some of the advantages of using oils instead of their fatty acids are obvious; viz., (1) lower cost due to a single process instead of two processes; (2) broader source of supply of raw material; (3) lighter color, due to the fact that splitting up the oil glyceride to obtain fatty acids darkens the acid and therefore darkens the final product. Another advantage that is not quite so obvious is that the glycerine naturally present in the oil is available for recombination when the oil is split up, and so about 10% less pure glycerine is required in the formula than when the fatty acids must be used, thus effecting further economy and efficiency.

The condensation products prepared from the short chain aliphatic polybasic acids, such as succinic acid, polyhydric alcohol, such as glycerol, and non-drying oils, such as cocoanut oil, in the manner described in the following examples are clear, light-colored, balsam-like, sticky, viscous liquids which are soluble in toluol. They may be blended with nitrocellulose in the solution form, and upon complete evaporation of solvent form films of adhesive lacquer which are not only flexible at low temperatures but are also flexible after long exposure to hot dry air conditions. Whereas, many balsam-like alkyd resins give good apparent plasticization of the nitrocellulose lacquer film for a while, they really plasticize only as long as there is some solvent retention, or unless liquid plasticizers of the commonly used types are used in addition to the resin.

In using resin-plasticizers prepared according to my invention, it is not necessary to use any liquid plasticizers in addition. This is of especial merit, inasmuch as liquid plasticizers are always gradually removed from the lacquer film by evaporaton or by migration, and in addition some others are rendered ineffective by oxidation, all of these resulting in gradual embrittlement of the film. This is particularly noticeable in lacquers used for coating cloth, paper, leather and other fabrics; the liquid plasticizer soaks into the porous fibres leaving the lacquer film unplasticized and therefore brittle. In other cases, the plasticizer may migrate from the lacquer film and cause unsightly "spewing". If the resin-plasticizers which I describe in this application are used, the flexibility is comparatively permanent, for the migration is stopped, the film is kept plasticized, and blushing does not take place.

My process should not be confused with that described by Weber in U. S. Patent 1,690,515, especially his Examples 1 and 4; as his process consists merely of heating drying oils together with glycerine and phthalic anhydride. These products are difficult to prepare in actual practice and are not uniform; they are also turbid due to the presence of free oil, as Weber himself admits (lines 54-64 inclusive). My process consists of special treatment in order to get the oil chemically combined in the final resinous product which is clear and homogeneous, having practically no free oil present. In my product, there should be no phthalic anhydride or any other of the commonly used cyclic polybasic acid equivalents if the desired property of flexibility at low temperatures is to be obtained. I use aliphatic dibasic acids of low molecular weight with less than four carbon atoms between the carboxyl groups. While I prefer to use straight chain acids having the general constitutional formula:

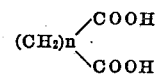

where $n$ is a whole number less than 4, or dibasic unsaturated acids with less than four carbon atoms between carboxyl groups (including in the group fumaric, maleic, glutaconic and itaconic acids), I may also use short hydroxy polybasic acids of the same length, as for example malic and citric acids. An advantage of the short chain acids is that due to the lower molecular weight, less of the polybasic acid is required by actual weight, which is almost always the most expensive ingredient of the resin. It is obvious that anhydrides may replace the corresponding acid, as for example, succinic anhydride may be used in place of succinic acid and maleic anhydride in place of maleic acid.

The manufacture of resin-plasticizers according to my preferred process involves prolonged heating of the oils and part of the polyhydric alcohol, preferably glycerine, in the presence of a very small amount of suitable catalyst in a closed kettle with agitators until an alcohol-soluble body is formed and then completing the reaction by adding the required amount of polybasic acid and, if necessary, an additional quantity of polyhydric alcohol and cooking under inert gas atmosphere until a suitable end-point is reached. Where glycerine is the polyhydric alcohol employed in this treatment, a monoglyceride of the non-drying oil is first formed in admixture with the uncombined glycerine, which mixture is soluble in alcohol, after which the reaction is completed by the treatment with the dibasic aliphatic acid, resulting in the formation of mixed glyceride which is compatible with nitrocellulose, cellulose esters and the like.

Catalysts which may be used for the combining of the oil and glycerine are hydroxides and oxides of the alkali metals and of the alkali earth metals. Other metal oxides are also very efficient, as for example, the lead oxides, especially litharge. Without such catalysts to split up the oils so that their decomposed parts may be recombined with the other ingredients, it is impossible to produce desirable products, because otherwise the reaction would have to be carried out at extremely high temperatures, this being highly undesirable because of the darkening of the product due to partial oxidation and because of the difficulty in controlling commercial sized batches at the high temperature.

So called "resin plasticizers" have been described (U. S. Patent 1,783,168) in which drying oils and fatty acids of drying oils have been used together. I have found that such plasticizers are only temporarily effective as long as there is some solvent retention and as long as oxidation does not go too far. It is only too easy in actual practice for small quantities of metallic compounds to get into the plasticizer solution which act as varnish driers on the drying oil glyceride component which speed up the oxidation with brittleness ensuing. This is especially true if the acid number is not kept to low limits. For the same reasons, it is highly essential for the sake of reliability that only non-drying oils be used in my product.

The following specific examples are given to illustrate the manner of carrying out my invention and the character of the products derived therefrom.

*Examples*

*Example 1.*—3000 parts of castor oil are heated with 700 parts of glycerol as rapidly as possible to 200° C. in closed kettle with agitation. At this point 0.6 part of litharge are introduced and the mixture heated to 232° C. until mixture becomes alcohol-soluble when after cooking to 175° C. 1125 parts of maleic acid are then introduced together with 175 parts more of glycerol. The mixture is heated at 170° to 190° C. until a thick, clear, homogeneous, light-colored liquid resin is obtained as the result of the reaction which is soluble in toluol, and which solution is completely miscible with solutions of nitrocellulose.

*Example 2.*—3000 parts of palm oil are heated with 750 parts of glycerol to 200° C. in closed kettle with agitation. At this point 3 parts of sodium hydroxide (C. P. stick form) are introduced and the mixture cooked at 232° C. until becoming alcohol-soluble. Here 1060 parts of succinic acid are added together with 190 parts more of glycerol. The mixture is heated at 200°–210° C. until a light-colored viscous liquid resin is obtained as the result of the reaction which has very little odor and which is soluble in toluol.

*Example 3.*—3000 parts of cocoanut oil are heated with 750 parts of glycerol to 200° C. as in the foregoing examples in the presence of 2 parts of lime. After becoming alcohol-soluble, 1060 parts of succinic acid and 190 parts of glycerol are added. The resulting reaction product after completion of cook is a clear, light-colored liquid resin soluble in toluol.

*Example 4.*—3000 parts of palm kernel oil are heated with 896 parts of di-ethylene glycol to 200° C. in closed kettle with agitation. At this point 0.6 parts of litharge are added, the mixture now being cooked at 232° C. until an alcohol-soluble body is formed. Here 880 parts of succinic anhydride are added together with 224 parts more of di-ethylene glycol. The mixture is heated at 200–210° C. until a light-colored, viscous resin is otbained which is soluble in toluol and which toluol solution is miscible with nitrocellulose solutions, imparting great flexibility and adhesion to dried films thereof without the addition of any liquid plasticizer.

Good results have been obtained by the use of substantially 60% by weight of oil, as indicated by the proportions given in the specific examples, but obviously this proportion may be varied somewhat without departing from the spirit of the invention.

It is understood that while these resin plasticizers are particularly desirable in the formulation of nitrocellulose lacquers, they can also be used to advantage with other cellulose esters and ethers, in general finishing materials and undercoats, and in many plastic molding materials as well.

These resins impart a permanent flexibility to lacquers used for coating paper, fabrics, leather, felt, rubber, thin sheet metal, ignition cable, and other flexible objects. In certain cases, it has been found that the lacquer plasticized with these resins has remained intact in spite of a break in the paper itself. Lacquers containing these resin-plasticizers do not lose the plasticizer by evaporation or migration and are therefore very desirable as coating materials for flexible objects, especially when the object is porous or fibrous, for in such cases the liquid type of plasticizer is absorbed and lost.

What I claim is:

1. A composition of matter comprising the condensation product of (1) an acid selected from a group consisting of short chain dibasic aliphatic acids such as succinic and maleic (2) a polydric alcohol and (3) one or more oils selected from a group consisting of non-drying oils, the ingredients being so combined and in such relative proportions as to produce a light colored, homogeneous, viscous plasticizer for nitrocellulose, soluble in toluol.

2. A composition of matter comprising a condensation product of (1) maleic acid (2) glycerol and (3) castor oil, combined in the proportions of approximately 1125 parts of the acid, 875 parts of glycerol and 3000 parts of the oil, said product being a thick, clear, homogeneous, light colored liquid resin soluble in toluol and miscible with solutions of nitrocellulose.

3. A composition of matter comprising the condensation product of (1) succinic acid (2) glycerol, and (3) palm oil, the ingredients being combined in substantially the proportions of 1060 parts of the acid, 940 parts of glycerol and 3000 parts of palm oil, said product being a light colored, viscous liquid resin soluble in toluol.

4. A process which comprises heating a non-drying oil with glycerol at a temperature of approximately 200° C. in a closed vessel with agitation, introducing a small portion of an alkaline catalyst and further heating until the mixture becomes alcohol-soluble, then introducing a further quantity of glycerol and a short chain dibasic acid such as succinic or maleic acid, and further heating and reacting the mixture, the ingredients being combined in such proportions as to produce a thick, clear, homogeneous nitrocellulose plasticizer, soluble in toluol.

ALMON G. HOVEY.